UNITED STATES PATENT OFFICE.

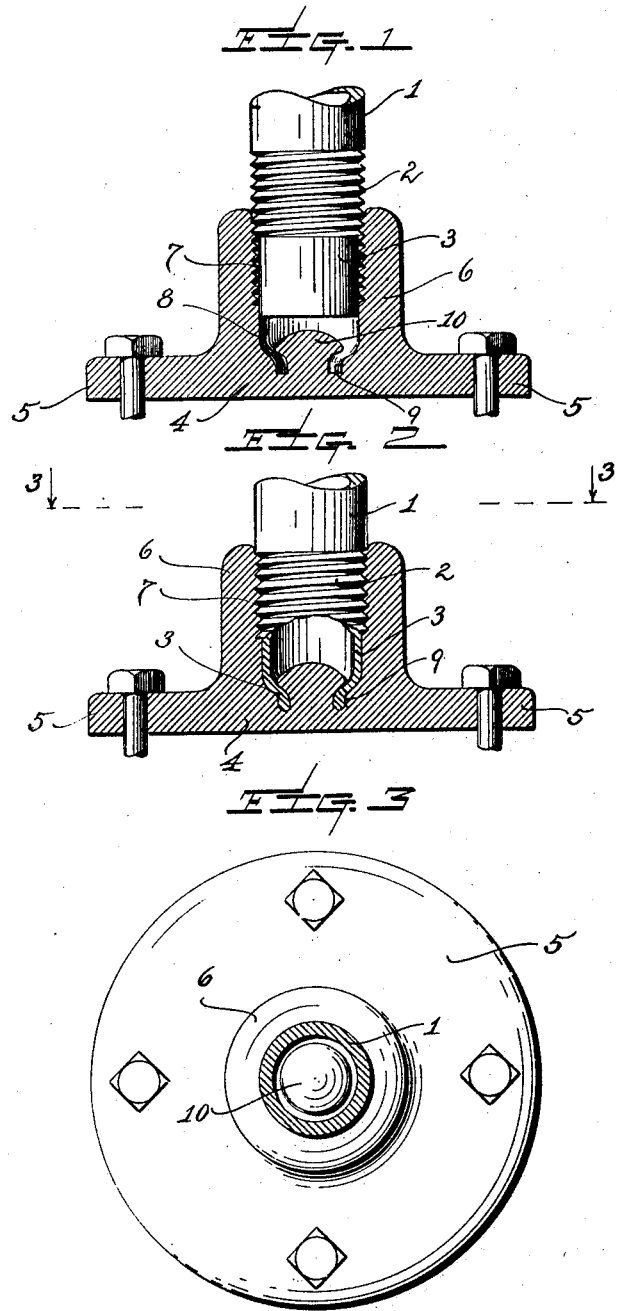

JOHN SCHNEIDER, OF ELIZABETHPORT, NEW JERSEY.

COUPLING.

1,393,171. Specification of Letters Patent. Patented Oct. 11, 1921.

Application filed December 18, 1919. Serial No. 345,891.

*To all whom it may concern:*

Be it known that I, JOHN SCHNEIDER, residing at Elizabethport, in the county of Union and State of New Jersey, have invented certain new and useful Improvements in a Coupling, of which the following is a specification.

This invention relates to pipe fittings, and one of the objects of the invention is to provide a new and improved means whereby a section of pipe or conduit may be connected to a supporting base, in such manner that when once connected they are so locked together that they cannot again be separated without the destruction of the connecting means as a whole.

A further object of the invention is to provide a threaded connection for pipes or conduits so that when once a connection is effected, relative rotative movement of the parts in any direction is prevented.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawing, wherein I have illustrated a preferred form of one embodiment of my invention:

Figure 1 is an elevational view, partly in section, illustrating my invention, with the parts in unlocked position.

Fig. 2 is a similar view, showing the parts in locked position; and

Fig. 3 is a sectional view, taken on line 3—3 of Fig. 2, looking in the direction of the arrows.

Referring now to the drawings, wherein similar reference characters refer to similar parts, throughout the several views thereof, the reference numeral 1 indicates a pipe or conduit, screw threaded near its end, as at 2, and having an unthreaded portion 3 at its end, said last named portion having a diameter less than that of the conduit proper.

4 indicates a coupling member having a flange 5, and a socket 6, the interior wall of which is threaded, as at 7, at its upper end, leaving the unthreaded portion 8 immediately thereunder. Socket 6 is inclined inwardly at its lower end and leads into a recess 9, a central headed post 10 being erected upon the lower wall of the socket, centrally thereof, which post, together with the inclined wall of the socket 6, forms the aforesaid recess 9. The recess 9 adjacent the head of the post is of substantially the same width as the thickness of the conduit, said recess, however, is enlarged downwardly for a purpose which will be apparent hereinafter.

The unthreaded part 3 of the conduit 9 is formed of such diameter as will enable it to pass into the socket 6 without engaging the screw threads thereof.

The manner of assembling the parts will be understood from an inspection of the drawing, it being evident that the end 3 of the conduit 1 is inserted within the socket so that the screw threads thereof will engage with those of the socket. The conduit 1 is then screwed downwardly, sufficient pressure being exerted thereon to cause the lower end to engage the inclined end of the socket 6 and be distorted so that when the parts are in locked position the unthreaded end 3 of the post will occupy the socket 9, which as above explained, is of a wider diameter than the normal thickness of the wall of the post; thus taking care of the increased thickness of the metal at the end of the post, due to its constricted diameter. It will be noted in Fig. 2, which illustrates the connection established, that the lower end of the pipe 1 is closed in about the neck of the headed post 10, which it grips solidly. Thus it will be seen that when the parts are once locked in the position shown in Fig. 2 of the drawings, it is impossible to separate them without destroying either the conduit or the fitting.

My invention is especially useful in connection with supports for electric signals, electric switches, and other analogous constructions wherein strong and durable supports for signals, switches and operating mechanism therefor are necessary.

As many changes could be made in this construction without departing from the scope of the following claims, it is intended that all matter contained in the above description or shown in the accompanying drawing shall be interpreted as illustrative only and not in a limiting sense.

Having thus described my invention what I claim as new and desire to secure by Letters Patent is:

1. In a device of the class described, in combination, the tubular member threaded near its end, with a tubular unthreaded extension, a fitting having a tubular threaded part, and a base having a socket containing a headed post provided with a constricted recess, said parts being adapted to be connected together so that the screw threaded parts are in engagement, and the unthreaded part of said conduit occupies the constricted recess in said fitting.

2. In a device of the class described, in combination, a tubular member having an unthreaded extremity with a threaded part located immediately thereabove, a fitting having a socket, the upper end of which is threaded and the lower end of which is not threaded and formed into a recess of less diameter than that of the socket, said parts being adapted to be connected together so that the threaded part of the conduit will be received in the threaded part of the socket, and the lower end of the tubular member will be forced into and caused to grip the said constricted recess at the bottom of the socket.

3. In a device of the class described, in combination, a tubular member having an unthreaded extremity with a threaded part located immediately thereabove, a fitting having a socket, the upper end of which is threaded and the lower end of which is not threaded and formed into a recess of less diameter than that of the socket, said parts being adapted to be connected together so that the threaded part of the conduit will be received in the threaded part of the socket, and the unthreaded part thereof received in said constricted recess, and one wall of said constricted recess being formed of an upstanding headed post erected from the bottom wall of said socket, and the lower end of the tubular member will be closed in and grip the head of the said post.

4. In a device of the class described, in combination, a tubular member having an unthreaded end portion and a threaded portion located directly thereabove, a fitting having a socket threaded at its upper end, but unthreaded at its lower end, said unthreaded end inclining inwardly, an upwardly extending post erected upon the bottom wall of said socket, said post having outwardly flaring walls whereby a recess is formed between the same and the inclined portion of said socket, said recess being of gradually increased width as it approaches its lower end, said parts being adapted to be united so that when the threaded portion of the conduit engages the threaded portion of the socket, the unthreaded end of the conduit will be forced inwardly and caused to enter said socket, whereby the lower end of the said tubular member grips the head of the said post.

In testimony whereof, I affix my signature in the presence of two witnesses.

JOHN SCHNEIDER.

Witnesses:
EMMA WEINBERG,
IRVING A. HAMER.